United States Patent
Wang et al.

(10) Patent No.: US 10,372,429 B2
(45) Date of Patent: Aug. 6, 2019

(54) METHOD AND SYSTEM FOR GENERATING ACCELERATOR PROGRAM

(71) Applicant: HUAWEI TECHNOLOGIES CO.,LTD., Shenzhen, Guangdong (CN)

(72) Inventors: Tao Wang, Beijing (CN); Fenglong Song, Beijing (CN); Jun Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/988,225

(22) Filed: May 24, 2018

(65) Prior Publication Data

US 2018/0267784 A1 Sep. 20, 2018

Related U.S. Application Data

(63) Continuation of application No. PCT/CN2016/105231, filed on Nov. 9, 2016.

(30) Foreign Application Priority Data

Nov. 25, 2015 (WO) ................ PCT/CN2015/095526

(51) Int. Cl.
*G06F 8/41* (2018.01)
*G06F 9/448* (2018.01)

(52) U.S. Cl.
CPC ............... *G06F 8/433* (2013.01); *G06F 8/42* (2013.01); *G06F 9/4498* (2018.02); *G06F 8/4452* (2013.01)

(58) Field of Classification Search
CPC .......... G06F 9/4498; G06F 8/42; G06F 8/433; G06F 8/4452
See application file for complete search history.

(56) References Cited

U.S. PATENT DOCUMENTS 6,112,288 A * 8/2000 Ullner ................... G06F 9/3851
707/999.006
6,212,677 B1 * 4/2001 Ohkubo ................... G06F 8/75
717/143
(Continued)

FOREIGN PATENT DOCUMENTS

| CN | 1781078 A | 5/2006 |
| CN | 101276308 A | 10/2008 |
| CN | 104503733 A | 4/2015 |

OTHER PUBLICATIONS

David Tarditi et al., "Accelerator: Using Data Parallelism to Program GPUs for General-Purpose Uses", [Online], Oct. 2006, pp. 325-335, [Retrieved from Internet on Mar. 29, 2019], <http://delivery.acnn.org/10.1145/1170000/1168898/p325-tarditi.pdf>.*

(Continued)

*Primary Examiner* — Ziaul A Chowdhury
(74) *Attorney, Agent, or Firm* — Huawei Technologies Co., Ltd.

(57) ABSTRACT

A method for generating an accelerator program is disclosed, to help increase utilization of an accelerator and increase program development efficiency. In some feasible implementations of the present invention, the method includes: obtaining an accelerator program description that is based on a state machine, where the accelerator program description includes multiple state machines separately configured to implement an application program, and the multiple state machines form a pipeline according to a data dependency in a directed acyclic graph DAG corresponding to the application program; and performing state machine splicing on the state machines in the accelerator program description by using an accelerator compilation tool, to generate an accelerator program.

21 Claims, 8 Drawing Sheets

Obtain an accelerator program description that is based on a state machine, where the accelerator program description includes multiple state machines separately configured to implement an application program, and the multiple state machines form a pipeline according to a data dependency in a directed acyclic graph DAG corresponding to the application program — 301

Perform state machine splicing on the state machines in the accelerator program description by using an accelerator compilation tool, to generate an accelerator program — 302

(56) References Cited

U.S. PATENT DOCUMENTS

| | | | | |
|---|---|---|---|---|
| 7,389,403 | B1* | 6/2008 | Alpert | G06F 9/3851 |
| | | | | 712/10 |
| 7,490,317 | B1* | 2/2009 | Hahn | G06F 8/433 |
| | | | | 717/121 |
| 8,589,867 | B2 | 11/2013 | Zhang et al. | |
| 8,959,496 | B2 | 2/2015 | Schulte et al. | |
| 2003/0200540 | A1* | 10/2003 | Kumar | G06F 8/433 |
| | | | | 717/161 |
| 2004/0172234 | A1 | 9/2004 | Dapp et al. | |
| 2004/0255303 | A1 | 12/2004 | Hogan et al. | |
| 2007/0169059 | A1* | 7/2007 | Halambi | G06F 8/4452 |
| | | | | 717/160 |
| 2008/0140999 | A1* | 6/2008 | Gong | G06F 9/3001 |
| | | | | 712/214 |
| 2008/0235676 | A1* | 9/2008 | Serebryany | G06F 8/433 |
| | | | | 717/154 |
| 2008/0250427 | A1 | 10/2008 | Shin | |
| 2008/0256330 | A1* | 10/2008 | Wang | G06F 8/447 |
| | | | | 712/24 |
| 2012/0144376 | A1* | 6/2012 | Van Eijndhoven | G06F 8/456 |
| | | | | 717/146 |
| 2012/0158635 | A1 | 6/2012 | Van Lunteren | |
| 2014/0006477 | A1* | 1/2014 | Drahzal | G06F 9/5044 |
| | | | | 709/203 |
| 2016/0092181 | A1* | 3/2016 | Rodgers | G06F 8/447 |
| | | | | 717/145 |
| 2016/0259874 | A1* | 9/2016 | Andrade | G06F 9/4498 |

OTHER PUBLICATIONS

Jonathon T. Giffin et al., "Detecting Manipulated Remote Call Streams", [Online], 2002, pp. 1-34, [Retrieved from Internet on Mar. 29, 2019], <https://www.usenix.org/legacy/event/sec02/full_papers/giffin/giffin_html/>.*

Rainer Pudinnat et al, "Feature Based Representation and Detection of Transcription Factor Binding Sites", [Online], 2004, pp. 1-10, [Retrieved from Internet on Apr. 11, 2019], <https://pdfs.semanticscholar.org/63a2/0d4e90d0f201849ece641207d3afabe30080.pdf >.*

Akihiro Hayashi et al., "Exploring Compiler Optimization Opportunities for the OpenMP 4.x Accelerator Model on a POWER8+ GPU Platform", [Online], 2016, pp. 68-78, [Retrieved from Interent on Apr. 11, 2019], <https://ieeexplore.ieee.org/stamp/stamp.jsp?arnumber=7836582>.*

John L. Hennessy et al, Computer Architecture: A Quantitative Approach. Fifth Edition, 2012, 857 pages.

Programs for Programmers, Intel. https://www.polyhedron.com/intel-index0htm, 20180522, 6 pages.

Michael D. Linderman, A Programming Model and Processor Architecture for Heterogeneous Multicore Computers. Feb. 2009, Stanford University, 2009 Doctoral Dissertation, 95 pages.

Larry Brown Ph.D., GPU Accelerated Deep Learning With Cudnn. Nvidia, Mar. 2015, 36 pages.

Deshanand P. Singh et al, Harnessing the Power of FPGAs using Alteras OpenCL Compiler. FPGA'13, Feb. 11-13, 2013, Monterey, California, USA, 1 page.

Anh Tuyen Tran, Accelerating performance with inline assembly using IBM XL C/C++ compiler on IBM z Systems. Published on Jun. 17, 2015, IBM Developer Works, 15 pages.

Gaurav Mitra et al, Use of SIMD Vector Operations to Accelerate Application Code Performance on Low-Powered ARM and Intel Platforms. 2013 IEEE 27th International Symposium on Parallel and Distributed Processing Workshops and PhD Forum, Oct. 31, 2013, 10 pages.

Eric S. Chung et al, Single-Chip Heterogeneous Computing: Does the Future Include Custom Logic, FPGAs, and GPGPUs? 2010 43rd Annual IEEE/ACM International Symposium on Microarchitecture, Jan. 20, 2011, 12 pages.

Baifeng Wu et al, The Data-Driven Multithreading Programming Model Based on DDF. Pervasive Computing and Applications, 2007. ICPCA 2007. 2nd International Conference on, Oct. 29, 2007, 5 pages.

Computer Architecture A Quantitative Approach 3rd version, Published in: Engineering, Technology, Apr. 26, 2014, 1141 pages.

C. Cascaval et al, A taxonomy of accelerator architectures and their programming models. IBM J. Res. and Dev. vol. 54 No. 5 Paper Sep./Oct. 5, 2010, 10 pages.

Thomas B. Jablin, Automatic Parallelization for GPUs. Doctoral Dissertation, Princeton University Princeton, NJ, USA, Apr. 2013, 102 pages.

Johann Hauswald et al, DjiNN and Tonic: DNN as a Service and Its Implications for Future Warehouse Scale Computers. ISCA'15, Jun. 13-17, 2015, Portland, OR USA, 14 pages.

Boutellier Jani et al:"Actor Merging for Dataflow Process Networks", IEEE Transactions on Signal Processing, IEEE Service Center, New York, NY, US, vol .63, No. 10, May 1, 2015 , pp. 2496-2508, XP011578297.

Ghislain Roquier et al: "Hardware/software co-design of dataflow programs for reconfigurable hardware and multi-core platforms", Design and Architectures for Signal and Image Processing(Dasi P), 2011 Conference on, IEEE, Nov. 2, 2011), pp. 1-7, XP032099264.

Jani Boutellier et al:"Towards Generic Embedded Multiprocessing for RVC-CAL Dataflow Programs", Journal of Signal Processing Systems, vol .73, No. 2, Mar. 6, 2013, pp. 137-142, XP055512957.

"Pangrle B M et al:"Design Tools for Intelligent Silicon Compilation", IEEE Transactions on Computer Aided Design of Integrated Circuits and Systems, IEEE Service Center, Piscataway, NJ, US, vol .6, No. 6, Nov. 1, 1987, pp. 1098-1112, XP000032233".

Peterson J B et al:"Scheduling and partitioning ANSI-C programs onto multi-FPGA CCM architectures", FPGAS for Custom Computing Machines, 1996. PROCEEDINGS.IEEE Symposium on Napa Valley, CA, USA Apr. 17-19, 1, Los Alamitos, CA, USA, IEEE Comput.Soc, US, Apr. 17, 1996, pp. 178-187, XP010206380.

* cited by examiner

```
def FSM FSM1
    State;
endFSM
```

FIG. 6

//State cycle, indicating that an instruction block between Branch and Label is cyclically executed multiple times according to a Cond condition

...

Branch To Label (Cond)

State;

...

Label

//State stay, indicating that a state instruction on this instruction line is repeatedly executed multiple times according to the Cond condition

...

State || Repeat(Cond);

...

//State delay, indicating that two state machines, that is, an FSM1 state machine and an FSM2 state machine simultaneously perform execution

...

FSM1 || FSM2;

...

//State delay, indicating that the FSM2 state machine is started N+1 cycles later than the FSM1 state machine

...

FSM1;

NOP(N);

FSM2;

```
1  def FSM LD0
2    LD R0, A[i+=1] || Repeat (100);
3  endFSM
4
5  def FSM LD1
6    LD R1, B[i+=1] || Repeat (100);
7  endFSM
8
9  def FSM ALU
10   ADD R2, R0, R1 || Repeat (100);
11 endFSM
12
13 def FSM ST
14   ST R2,C[j+=1] || Repeat (100);
15 endFSM
```

FIG. 11

```
1  def FSM PIPE
2    LD0 || LD1 ;  // Two state machines are simultaneously started
3    NOP(3);
4    ALU;   // An ALU state machine is started four cycles later than an LD state machine
5    NOP;
6    ST ;   // An ST state machine is started two cycles later than the ALU state machine
7  endFSM
```

FIG. 12

```
1  LD R0, A[i+=1] || LD R1, B[i+=1] || Repeat (4);
2  LD R0, A[i+=1] || LD R1, B[i+=1] || ADD R2, R0, R1 || Repeat (2);
3  LD R0, A[i+=1] || LD R1, B[i+=1] || ADD R2, R0, R1 || ST R2, C[j+=1] || Repeat (94);
4  ADD R2, R0, R1 || ST R2, C[j+=1] || Repeat (4);
5  ST R2, C[j+=1] || Repeat (2);
```

METHOD AND SYSTEM FOR GENERATING ACCELERATOR PROGRAM

CROSS-REFERENCE TO RELATED APPLICATIONS

This application is a continuation of International Application No. PCT/CN2016/105231, filed on Nov. 9, 2016, which claims priority to International Application No. PCT/CN2015/095526, filed on Nov. 25, 2015, both of which are hereby incorporated by reference in their entireties.

TECHNICAL FIELD

The present invention relates to the field of computer technologies, and in particular, to a method and a system for generating an accelerator program.

BACKGROUND

Rapid development of the mobile Internet, cloud computing, and the Internet of Things is accompanied with a constant increase in a data amount and computing complexity in fields of engineering application and scientific computing, and it is difficult for a computing capability of a general-purpose central processing unit (CPU) to satisfy computing requirements in the fields. To satisfy computing requirements of algorithms in the fields, various accelerators appear, and are widely applied to many computing fields. An accelerator is a dedicated hardware device used to perform a particular function, is a part of a general-purpose computing system, and cannot exist without a general-purpose processor. The accelerator is directly oriented towards an application algorithm, uses a dedicated processor architecture, can well balance a relationship among performance, an area, and power consumption that are of a processor, and may be considered as a special processor. Compared with a conventional general-purpose processor, the accelerator has many unparalleled advantages. For example, in terms of both computing performance and storage bandwidth, the accelerator is far better than the general-purpose processor.

Heterogeneous convergence of "general-purpose processor+dedicated accelerator" is a development direction of an application driven processor architecture. On the one hand, the general-purpose processor can process scalar computing and provide a general computing capability, so that the heterogeneous system can be applicable to various application fields. On the other hand, the dedicated accelerator can provide strong computing performance for applications in some particular fields, so that the heterogeneous system has fine performance and relatively low energy consumption.

However, when oriented towards applications in different fields, regardless of the general-purpose processor or the dedicated accelerator, actual performance of the processor is far lower than peak performance, and is usually lower than 50%. In terms of hardware, computing and storage performance of the processor or the accelerator is becoming higher. In terms of software, how to efficiently utilize a computing capability of the processor or the accelerator and reduce programming burden of a programmer has become a key problem that is faced during program development.

A programming model mainly focuses on the foregoing problem. The programming model is abstraction for a computer hardware system structure, and establishes a relationship between the computer hardware system structure and an application programming interface, so that an application program may be executed in a computer hardware system. The programming model focuses on improving program performance, development efficiency, and scalability for another system design. A higher level of hardware abstraction of a programming model indicates smaller programming burden of a programmer and higher compilation complexity. Therefore, the programming model directly affects hardware utilization of the processor.

High performance is a main objective of the dedicated accelerator, an architecture of the dedicated accelerator is usually closely coupled to a field algorithm, and an instruction set is extremely complex. This mainly brings impact in two aspects. In one aspect, logical combination cannot be performed on complex and special instructions in the dedicated accelerator by using a basic arithmetic instruction, and consequently mapping cannot be directly performed by using a compilation technology and an advanced language. In the other aspect, there is a big difference between architectures of accelerators oriented towards different application algorithms, and a compiler needs to be modified for different processor instruction set structures, and this requires massive work. Consequently, program development performed on the dedicated accelerator is usually manually optimized, and efficiency is extremely low.

SUMMARY

Embodiments of the present invention provide a method and a system for generating an accelerator program, to help increase utilization of an accelerator and increase program development efficiency.

A first aspect of the present invention provides a method for generating an accelerator program, including: obtaining an accelerator program description that is based on a state machine, where the accelerator program description includes multiple state machines separately configured to implement an application program, and the multiple state machines form a pipeline according to a data dependency in a directed acyclic graph DAG corresponding to the application program; and performing state machine splicing on the state machines in the accelerator program description by using an accelerator compilation tool, to generate an accelerator program.

In the technical solution, the accelerator program description that is based on a state machine is obtained, and the state machine splicing is performed on the state machines in the accelerator program description by using the accelerator compilation tool, to generate the accelerator program, so that instruction level parallelism can be implemented, and hardware performance utilization of an accelerator is improved. In the technical solution, the compilation tool needs to compile only the program description, and the compilation tool does not need to perform mapping between an advanced language and an accelerator instruction set, so that relatively good performance is obtained when program development is performed on the accelerator. Compared with an accelerator program that is for a particular algorithm and that needs to be manually developed and optimized by an assembly programmer, in the technical solution, program development efficiency can be improved while ensuring pipeline utilization. Compared with program development performed by using a compilation technology, better program performance can be obtained in some field-dedicated accelerators by means of the technical solution.

In a first possible implementation, the performing state machine splicing on the state machines in the accelerator program description by using an accelerator compilation tool, to generate an accelerator program includes: establishing an intermediate expression of each state machine in the accelerator program description, and splicing intermediate expressions that have a same structure and that are of different state machines, to generate a combined state machine and obtain the accelerator program.

The splicing intermediate expressions that have a same structure and that are of different state machines can improve instruction level parallelism, and help improve the hardware performance utilization of the accelerator.

With reference to the first aspect or the first possible implementation of the first aspect, in a second possible implementation, the method further includes: performing program correctness detection on the generated accelerator program. Further, the performing program correctness detection on the generated accelerator program may include: performing program correctness detection on the accelerator program by detecting whether the generated accelerator program satisfies a constraint of an accelerator instruction set.

When the accelerator program is generated by means of the state machine splicing, dependence between accelerator programs is weakened. Therefore, a written accelerator program may be erroneous, and it is extremely difficult to find such an error in a state machine of a single functional component, and such an error can be found only after the entire accelerator program is analyzed. By performing program correctness detection, it can be ensured that a correct accelerator program is output.

With reference to the first aspect or the first or the second possible implementation of the first aspect, in a third possible implementation, the obtaining an accelerator program description that is based on a state machine includes: describing a program data flow diagram by using the directed acyclic graph DAG, separately creating state machines of multiple nodes in the DAG by using the accelerator instruction set, and establishing the pipeline between the state machines according to a time delay indicated by a side in the DAG, to obtain the accelerator program description that is based on a state machine.

The program data flow diagram is described by using the DAG, and the state machines are created by using the accelerator instruction set, so as to obtain the accelerator program description that is based on a state machine. The compilation tool does not need to perform mapping between the advanced language and the accelerator instruction set, so that the relatively good performance is obtained when the program development is performed on the accelerator.

A second aspect of the present invention provides a system for generating an accelerator program, including: an obtaining module, configured to obtain an accelerator program description that is based on a state machine, where the accelerator program description includes multiple state machines separately configured to implement an application program, and the multiple state machines form a pipeline according to a data dependency in a directed acyclic graph DAG corresponding to the application program; and a compilation module, configured to perform state machine splicing on the state machines in the accelerator program description by using an accelerator compilation tool, to generate an accelerator program.

In this technical solution, the accelerator program description that is based on a state machine is obtained, and the state machine splicing is performed on the state machines in the accelerator program description by using the accelerator compilation tool, to generate the accelerator program, so that instruction level parallelism can be implemented, hardware performance utilization of an accelerator is improved, and program development efficiency is improved.

In a first possible implementation, the compilation module is specifically configured to: establish an intermediate expression of each state machine in the accelerator program description, and splice intermediate expressions that have a same structure and that are of different state machines, to generate a combined state machine and obtain the accelerator program.

The splicing intermediate expressions that have a same structure and that are of different state machines can improve instruction level parallelism, and help improve the hardware performance utilization of the accelerator.

With reference to the second aspect or the first possible implementation of the second aspect, in a second possible implementation, the compilation module is further configured to perform program correctness detection on the generated accelerator program. Further, the compilation module may further include a correctness detection unit, configured to perform correctness detection on the accelerator program by detecting whether the generated accelerator program satisfies a constraint of an accelerator instruction set.

When the accelerator program is generated by means of the state machine splicing, dependence between accelerator programs is weakened. Therefore, a written accelerator program may be erroneous, and it is extremely difficult to find such an error in a state machine of a single functional component, and such an error can be found only after the entire accelerator program is analyzed. By performing program correctness detection, it can be ensured that a correct accelerator program is output.

With reference to the second aspect or the first or the second possible implementation of the second aspect, in a third possible implementation, the system further includes: a program description module, configured to: describe a program data flow diagram by using the directed acyclic graph DAG, separately create state machines of multiple nodes in the DAG by using the accelerator instruction set, and establish the pipeline between the state machines according to a time delay indicated by a side in the DAG, to obtain the accelerator program description that is based on a state machine.

The program data flow diagram is described by using the DAG, and the state machines are created by using the accelerator instruction set, so as to obtain the accelerator program description that is based on a state machine. The compilation tool does not need to perform mapping between the advanced language and the accelerator instruction set, so that the relatively good performance is obtained when the program development is performed on the accelerator.

A third aspect of the present invention provides a computer device, and the computer device includes a processor and a memory. The memory is configured to store a program, and when the computer device runs, the processor executes the program stored in the memory, so that the computer device performs the method for generating an accelerator program according to the first aspect of the present invention.

It can be learned from the foregoing description that, in some feasible implementations of the present invention, a method and a system for generating an accelerator program are provided, so that utilization of an accelerator is improved, and program development efficiency is improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make a person skilled in the art understand the technical solutions in the present invention better, the following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
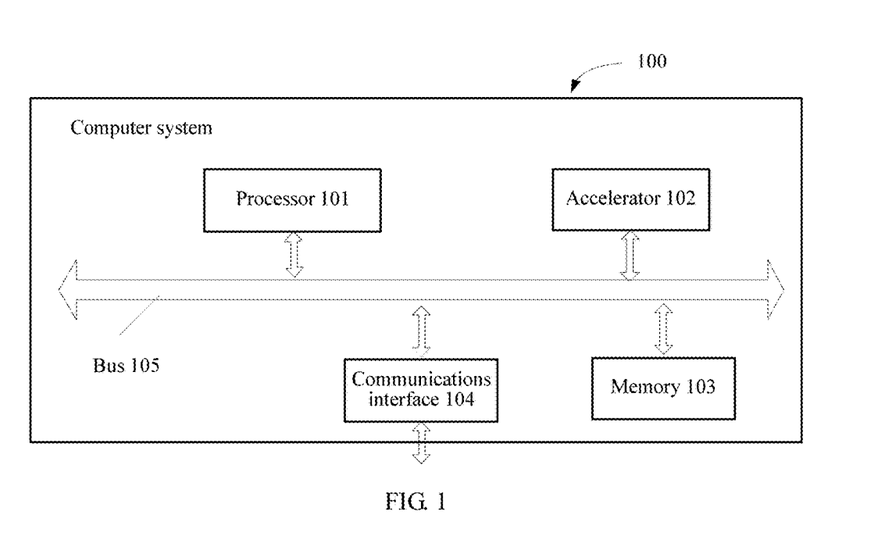
FIG. 1 is a schematic diagram of a computer system.

The technical solutions in the embodiments of the present invention are applied to a computer system that includes an accelerator, and in particular, to a heterogeneous system that includes a general-purpose processor and an accelerator. Referring to FIG. 1, FIG. 1 is a schematic diagram of a computer system 100. The computer system includes at least one general-purpose processor 101 and at least one accelerator 102. The general-purpose processor 101 provides general computing and processing capabilities, and is usually a CPU chip used for a server or a desktop computer. The accelerator 102 is configured to assist the general-purpose processor in performing a particular processing task, and can provide strong computing performance for an application in a particular field. For example, a graphics accelerator can process video rendering. The accelerator may also be referred to as a dedicated accelerator or a coprocessor. Actually, the accelerator 102 may be considered as a special processor. The at least one general-purpose processor 101 and the at least one accelerator 102 form a heterogeneous processing system that is briefly referred to as the heterogeneous system. It is easy to understand that the computer system 100 may further include a memory 103, a communications interface 104, a bus 105, and the like. The processor 101, the accelerator 102, the memory 103, and the communications interface 104 may communicate with each other by using the bus 105. The memory 103 may store a program. The program may be configured to be executed by the processor 101 and the accelerator 102.

Figure 2:
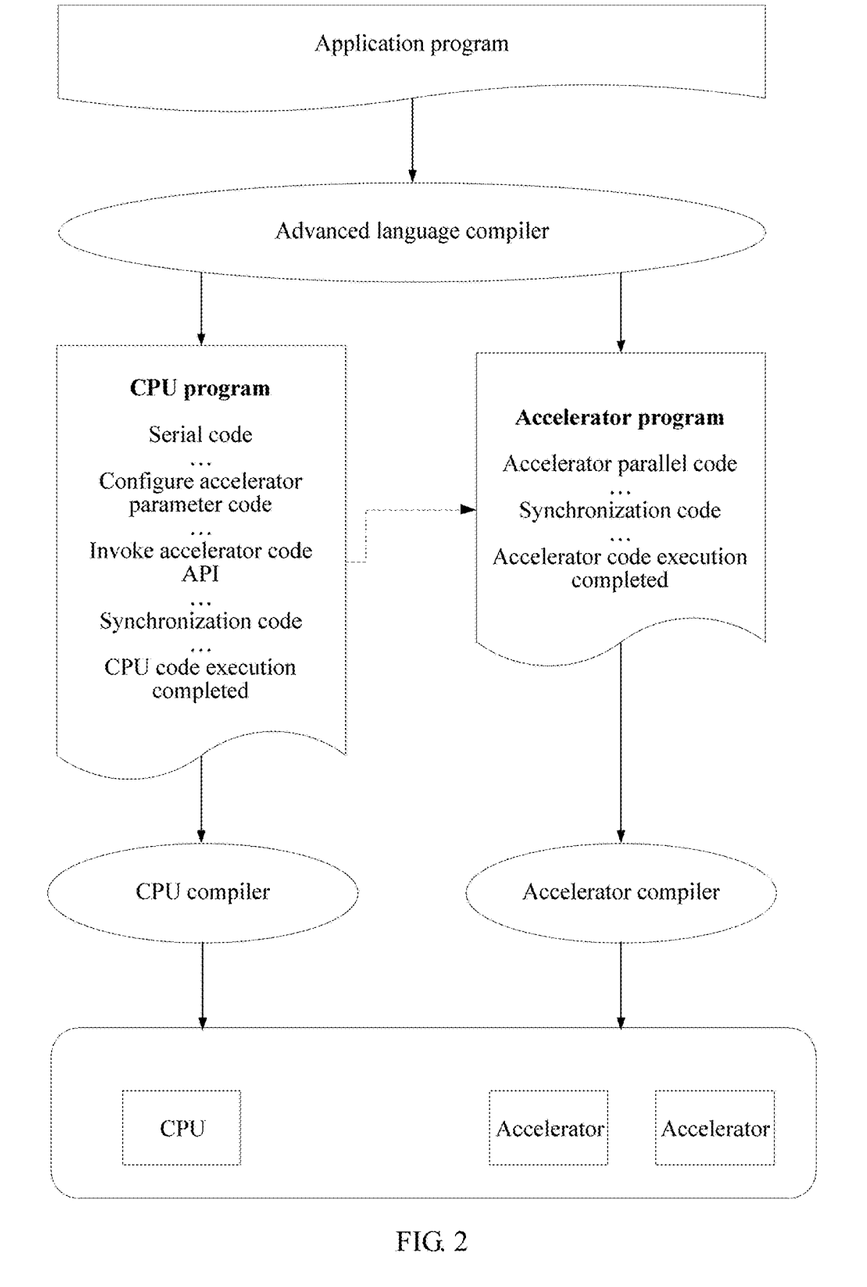
FIG. 2 shows a basic framework structure of a model for generating an accelerator program.

FIG. 2 shows a basic framework structure of a programming model. The programming model may be implemented by using a library-based program development method. As shown in FIG. 2, an application program is compiled by using an advanced language compiler to generate a CPU program and an accelerator program. The two programs are compiled by using respective compilers (a CPU compiler and an accelerator compiler), to generate executable code to be run on hardware devices (a CPU and an accelerator). The programming model may be a data driven programming model that is based on a data driven programming idea.

Referring to the programming model shown in FIG. 2, an embodiment of the present invention provides an accelerator program generation method, to implement instruction level parallelism, and improve hardware performance utilization of an accelerator, so that a hardware resource of the accelerator is used efficiently.

Detailed descriptions are separately provided below by using specific embodiments.

Embodiment 1

Figure 3:
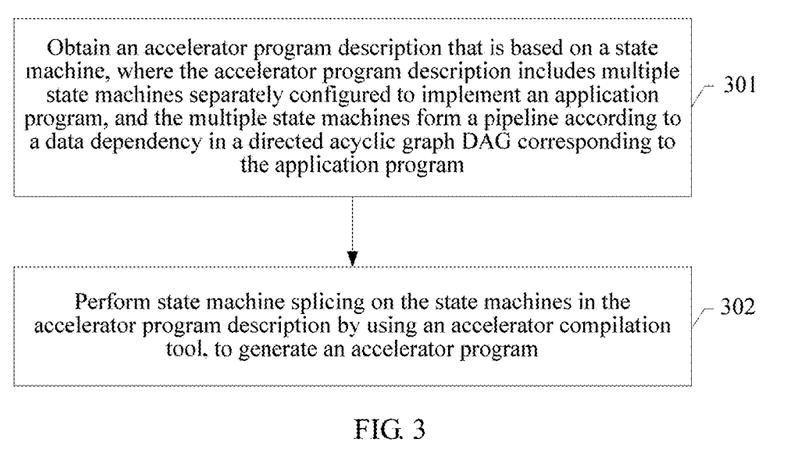
FIG. 3 is a flowchart of a method for generating an accelerator program according to an embodiment of the present invention.

Referring to FIG. 3, this embodiment of the present invention provides a method for generating an accelerator program. The method may be applied to the computer system shown in FIG. 1. The method may include the following steps.

301: Obtain an accelerator program description that is based on a state machine, where the accelerator program description includes multiple state machines separately configured to implement an application program, and the multiple state machines form a pipeline according to a data dependency in a directed acyclic graph DAG corresponding to the application program.

In some embodiments, a process of generating the accelerator program description may include: describing a program data flow diagram by using the directed acyclic graph (DAG), separately creating state machines of multiple nodes in the DAG by using an accelerator instruction set, and establishing the pipeline between the state machines according to a time delay indicated by a side in the DAG, to obtain the accelerator program description.

Figure 4:
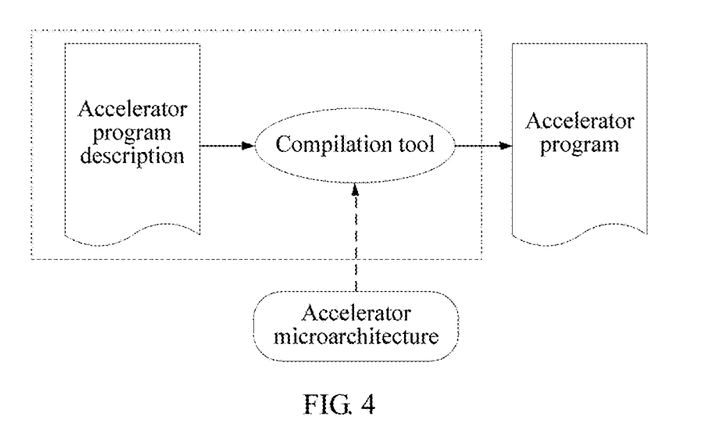
FIG. 4 is a schematic flowchart of performing a method according to an embodiment of the present invention.

Implementation of the method in this embodiment of the present invention includes two stages. In a block diagram shown in FIG. 4, in the first stage, the accelerator program description is generated, and in the second stage, the accelerator program description is compiled by using a compilation tool, to generate an accelerator program. In the first stage, the accelerator program description may be implemented based on a state machine, an entire pipeline is expressed by using the state machine, and the pipeline expressed by the state machine is used as basic input of the compilation tool.

The accelerator program description may be briefly referred to as a program description. In some embodiments, the accelerator program description may be manually written by a programmer by using the accelerator instruction set, and the computer system receives an accelerator program description that is entered by a user. In some other embodiments, the accelerator program description may be automatically generated, that is, the computer system writes the accelerator program description by using the accelerator instruction set. A method and a process of generating the program description are described below in detail.

A finite state machine (FSM) is briefly referred to as a state machine, and is a mathematical model that indicates a finite quantity of states and behavior such as shifting between these states and actions of the states. Essentially, a processor or an accelerator internally includes many combinatorial circuits and sequential circuits, and these combinatorial circuits and sequential circuits are driven by an application program that is run on the processor or the accelerator, to be transited between a finite quantity of states, and form a large state machine. Each application program may be indicated by using a complex state machine. Similarly, the processor or the accelerator may also be considered as a state machine driven by an application program.

Figure 5:
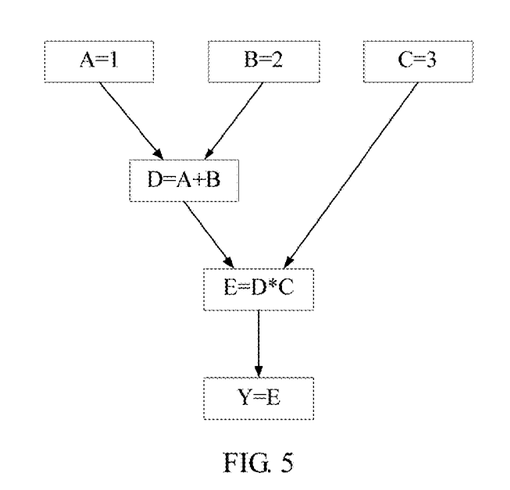
FIG. 5 is a schematic diagram of a directed acyclic graph (DAG)

In a compilation technology, the directed acyclic graph is usually used to indicate a data dependency between instructions. A typical DAG is shown in FIG. 5. Each application program may be split into multiple functional components (or tasks). Each functional component is considered as a node. A connection line between nodes is referred to as a side, and indicates a delay between the nodes. That is, a program data flow diagram of each application program may be described by using the DAG. One node in the DAG may be considered as one basic program block, and may be expressed by using one independent state machine. Similarly, in the DAG, a node may also be used to indicate an instruction in an application program, and a side is used to indicate a data dependency between instructions. When an instruction needs to use data that is processed according to another instruction, there is a data dependency between the instructions. An instruction in a node is executed by an internal functional component (which is a hardware circuit in this case) of the processor. One functional component may execute multiple different instructions. In the DAG in embodiments of this patent, multiple instructions executed by a functional unit are analyzed together, and a functional component is used to indicate a node in the DAG. In this case, the node indicates that the functional component is transited between several particular states (which are for different instructions, and a same instruction may be considered as a special case of the different instructions). That is, the node in the DAG indicates a state machine of each functional component of an application program, a side of the DAG indicates a data dependency between state machines of functional components, and the complete DAG is a combined state machine that includes state machines of multiple functional components. In addition, the complete DAG includes functional units and a data dependency between the functional units, and therefore, the complete DAG may be considered as a pipeline formed inside a processor corresponding to the application program.

Referring to Table 1, Table 1 indicates a relationship between a state machine and a DAG from a perspective of an internal circuit of a processor or an accelerator: The entire DAG may be considered as a complete pipeline, a node in the DAG is a state machine of each functional component of an application program, and a side of the DAG indicates a delay between state machines.

TABLE 1

| DAG graph | Internal circuit of a processor |
|---|---|
| Complete DAG | Pipeline |
| Node | State machine |
| Side | Delay between state machines |

It can be learned that an application program may be considered as a software expression manner of a state machine inside a processor or an accelerator, and the application program may be expressed by using the state machine. A complete code segment of an application program is considered as a pipeline. The pipeline internally includes complex state machines, and these complex state machines of functional components finally form the application program according to a data dependency between the state machines.

In this embodiment of the present invention, a process of generating an accelerator program description that is based on a state machine is designed according to the relationship between a state machine and a DAG, and the process includes the following basic steps.

1. Describe a Program Data Flow Diagram by Using a DAG

A program data flow diagram of an application program may be described by using the DAG and with reference to a microarchitecture (microarchitecture) parameter of an accelerator. The DAG includes multiple nodes and sides that connect the nodes. Each node indicates a functional component (or a task) of the program, and a side that connects two nodes is used to indicate a time delay between the two nodes.

2. Separately Create State Machines of Nodes in the DAG by Using an Accelerator Instruction Set.

A state machine of a functional component is created for each node in the DAG. The created state machine may be described by using dedicated pseudocode. The dedicated pseudocode (Pseudocode) is an algorithm description language that is between a natural language and a programming language, and points out an algorithm function in a writing form of the programming language. A structure of an entire algorithm running process may be described in a form close to the natural language.

3. Establish a Pipeline Between the State Machines According to a Time Delay Indicated by a Side in the DAG A weighted value on the side of the DAG reflects a startup delay between the state machines, and may be described by using the dedicated pseudocode. The delay between the state machines is described by using the dedicated pseudocode, and the state machines are connected in series, to form the pipeline. The pipeline described by using the dedicated pseudocode and the state machines form the accelerator program description.

Figure 6:
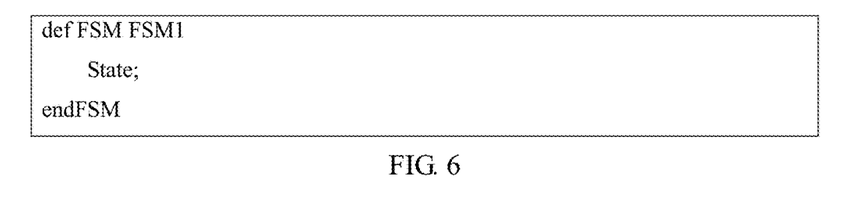
FIG. 6 is a schematic diagram of a basic definition of a state machine.

A definition of the state machine may be indicated by using the dedicated pseudocode. In an embodiment, an entire state machine may start with a keyword "def FSM FSM_NAME", and end with "endFSM". A basic action set of the state machine is between the two keywords, and may be completed by using a basic instruction set of the accelerator (which is briefly referred to as an accelerator instruction set). FIG. 6 provides an example of a basic definition of a state machine. FSM1 indicates a name of the state machine, and State indicates a specific action set that is of the state machine and that is generated by using an accelerator instruction set. Similarly, state characteristic attributes such as state cycle, state stay, and state delay may be defined, and are separately shown in FIG. 7.

Figure 7:
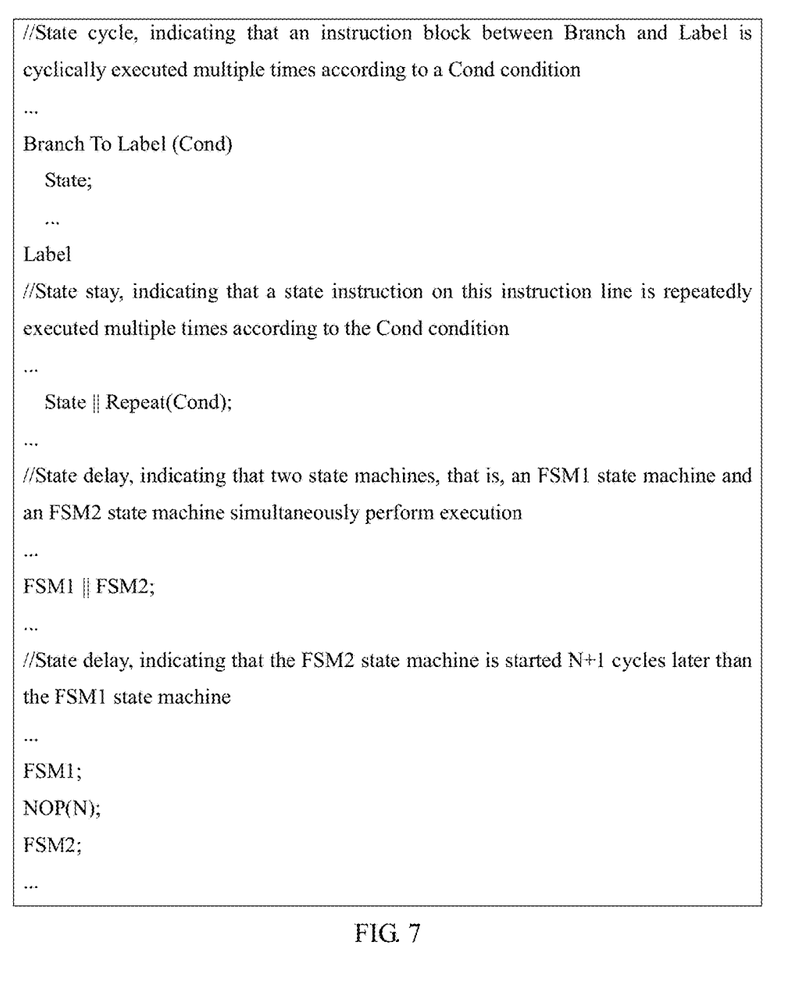
FIG. 7 is a schematic diagram of state cycle, state stay, and state delay of a state machine.

The state cycle is defined as "Branch to label(cond) . . . state . . . label", and indicates that an instruction block state between branch and label is cyclically executed multiple times according to a cond condition, and after each time of execution, a corresponding register value is changed, to determine whether the cond condition is satisfied. The state stay is defined as "state∥repeat(cond)", and indicates that a state instruction is repeatedly executed multiple times according to the cond condition. There are two types of state delay that are respectively: "FSM1∥FSM2" indicating that an FSM1 state machine and an FSM2 state machine are simultaneously started, and "FSM1; NOP(N); FSM2" indicating that the FSM2 state machine is started N+1 clock cycles later than the FSM1 state machine.

According to the foregoing description, in this step, the accelerator program description that is based on a state machine is established, and is saved in the memory, so that the compilation tool can access and obtain the accelerator program description. The accelerator program description includes the multiple state machines respectively configured to implement the multiple functional components of the application program, and the multiple state machines form the pipeline according to the data dependency in the DAG corresponding to the application program. The pipeline is used as a complete description of the application program, and is used as the basic input of the compilation tool.

302: Perform state machine splicing on the state machines in the accelerator program description by using an accelerator compilation tool, to generate an accelerator program.

In the second stage of the implementation of the method in this embodiment of the present invention, the compilation tool compiles the accelerator program description, to generate the accelerator program. A full name of the compilation tool is the accelerator compilation tool, or the compilation tool may be referred to as a compiler. The compilation tool receives the accelerator program description that is based on a state machine as the basic input, analyzes a basic structure of the accelerator program description according to an accelerator microarchitecture characteristic, establishes an intermediate expression of each state machine in the accelerator program description, and splices intermediate expressions that have a same structure and that are of different state machines, to generate a combined state machine and obtain the accelerator program. In addition, program correctness detection may be further performed on the generated accelerator program, to finally output a complete and correct accelerator program.

Figure 8:
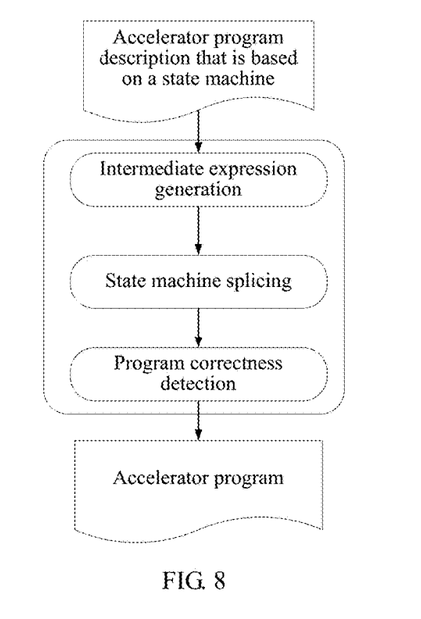
FIG. 8 is a flowchart of generating, by a compilation tool, an accelerator program according to an accelerator program description.

As shown in FIG. 8, FIG. 8 is a flowchart of generating, by a compilation tool, an accelerator program according to an accelerator program description. The flowchart includes three stages:

1. Intermediate Expression Generation.

An intermediate expression of the compilation tool is a basis on which the compilation tool works. All common compilation tools implement a compilation function by using the intermediate expression. The intermediate expression is a representation manner of transitional intermediate code between an advanced language program that needs to be compiled and final target code. Introduction of the intermediate expression may be beneficial to optimization and migration of the target code, and beneficial to organization, labor division, debugging, and the like of a compiled program. The intermediate expression generally has representation manners such as a reverse polish notation, a quaternary expression, a ternary expression, and a tree representation. In this embodiment of the present invention, a quaternary expression is used as an example of the intermediate expression. The compilation tool may respectively construct state machines of multiple nodes into quaternary expressions according to the accelerator program description, to express characteristics such as a sequence, a branch, and a cycle that are of a program, that is, program blocks such as a sequential block, a cyclical block, and a repetitive block. That is, each state machine may be constructed into multiple program blocks indicated by a quaternary expression.

In other words, the compilation tool may analyze a basic structure of each state machine in the accelerator program description by using the accelerator program description as basic input and based on an accelerator microarchitecture characteristic, that is, based on types and a quantity of registers of an accelerator, an instruction type, an instruction addressing manner, types and a quantity of operation units that execute an accelerator instruction, and the like, and convert each state machine into an intermediate expression. The intermediate expression includes one or more of a sequential block, a cyclical block, or a repetitive block. It should be noted that, in this step, a program description represented by pseudocode may be converted into an intermediate expression that has an attribute, for state machine splicing.

It should be noted that, the quaternary expression is a form of intermediate code that is closer to the target code, and a general behavior is (op, arg1, arg2, result), where op indicates an operation type, arg1 and arg2 indicate two source operands, and result indicates an operation result.

2. State Machine Splicing.

A fundamental objective for designing the compiler is to splice state machines. After receiving a program description that is based on a state machine, the compilation tool generates proper intermediate expressions, and then performs state machine splicing on state machines expressed by the intermediate expressions. While ensuring correct program splicing, a state machine splicing algorithm reduces as much compilation time as possible, reduces a code volume, and improves quality of a generated application program. The intermediate expressions are combined, to improve instruction level parallelism inside a single accelerator or processor, and reduce the code volume.

It should be noted that, in the previous step, each state machine has already been constructed into the multiple program blocks indicated by the intermediate expression. The state machine splicing performed in this step is essentially to splice program blocks. Each program block may be further considered as one sub-state machine.

In some embodiments, when splicing the state machines, the compilation tool may combine program blocks that have a same structure type and that are in different state machines into a combined state machine, including: splicing sequential blocks in the different state machines, splicing cyclical blocks in the different state machines, or splicing repetitive blocks in the different state machines. If the program blocks that have the same structure type are combined during the state machine splicing, pipeline cavitation can be eliminated. It is determined, according to a timing constraint relationship between the different state machines, to splice intermediate expressions that are of the state machines and that have a same structure and can be concurrently executed, so as to concurrently execute instructions in the different state machines.

3. Program Correctness Detection.

In a programming model in which an accelerator program is generated by means of the state machine splicing, during writing of the accelerator program, attention needs to be paid only to state machines of different functional components, and dependence between accelerator programs is weakened. Therefore, a written accelerator program may be erroneous, and it is extremely difficult to find such an error in a state machine of a single functional component, and such an error can be found only after the entire accelerator program is analyzed. Therefore, in some embodiments, after the compilation tool performs the state machine splicing to generate the accelerator program, the method further includes a step of performing correctness detection on the entire accelerator program. The correctness detection may be performed on the generated accelerator program by detecting whether the generated accelerator program satisfies a constraint of an accelerator instruction set. The program correctness detection may include syntax structure detection, resource conflict detection, data correlation detection, and the like.

Figure 9:
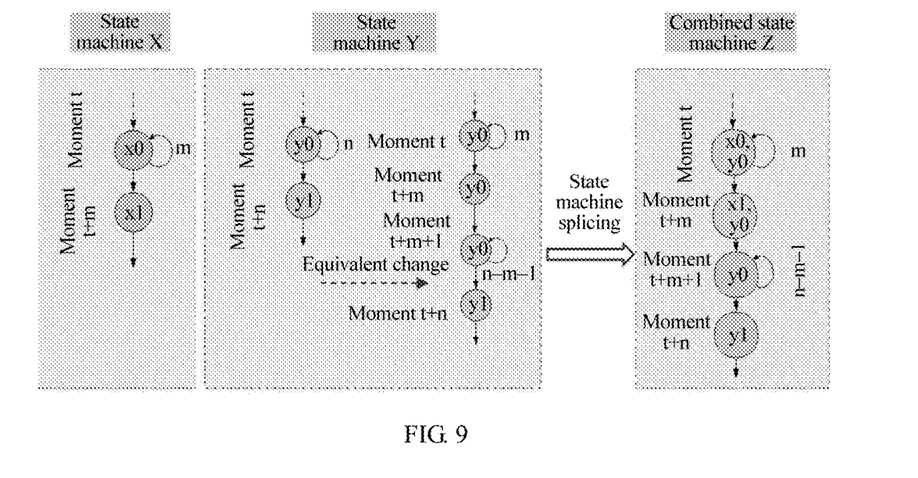
FIG. 9 is a schematic diagram of a process of splicing two state machines.

For example, FIG. 9 shows a process of splicing two state machines. As shown in FIG. 9, it is assumed that there are two state machines X/Y. X repeats a state x0 for m times, and Y repeats a state y0 for n times. It is assumed that n>m, and both n and m are positive integers. To splice the two state machines, the state machine Y is first equivalently changed into a structure that is the same as that of X, that is, the repetition for n times is broken down into m times, once, and n−m−1 times, and then two states that are respectively repeated for m times and once are combined, to form a new combined state machine that is shown on the right of FIG. 9. Both X and Y repeat the states x0 and y0 for m times. Then, in a next cycle, x1 is output, and Y repeats the state y0 once again. Then, in next several cycles, Y repeats the state y0 for n−m−1 times again, or y1 is output.

An essence of the state machine splicing is to search, under a timing constraint, for program blocks (sequential blocks, repetitive blocks, or cyclical blocks) that can be concurrently executed and that are among multiple state machines. As shown in FIG. 9, two state machines X/Y respectively include instructions x0/x1 and y0/y1. At a moment t, a state of the state machine X is x0 (that is, executing the instruction x0), and the state is repeated for m clock cycles; and at a moment t+m, the state is transited to the state x1. At the moment t, a state of the state machine Y is y0, and the state is repeated for n clock cycles; and at a moment t+n, the state is transited to the state y1. It is assumed that n>m+1, and both n and m are positive integers. When the two state machines X/Y are combined, one program block is taken out from each of the two state machines according to a program block execution sequence, that is, a repetitive block x0 that is in X and that is repeated for m times, and a repetitive block y0 that is in Y and that is repeated for n times. Because n>m, the repetitive block y0 that is repeated for n times is equivalently changed into two repetitive blocks that are repeated for m times and n−m times. In this way, the repetitive blocks x0 and y0 that are in X/Y and that are both repeated for m times may be spliced, to generate a new repetitive block (x0, y0) that is repeated for m times, indicating that in this state, the instructions x0 and y0 that are from the two state machines X/Y are simultaneously executed, and are repeatedly executed for m clock cycles. During the second time of splicing, the state machine X includes the sequential block x1, and the state machine Y includes the repetitive block y0 that is repeated for n−m times. In this case, the repetitive block that is repeated for n−m times continues to be equivalently changed into a sequential block y0 and a repetitive block y0 that is repeated for n−m−1 times, and the sequential blocks x1 and y0 are spliced to generate a new sequential block (x1, y0), indicating that in this state, the instructions x1 and y0 that are from the X/Y are simultaneously executed. During subsequent splicing, X has no state that is not spliced, and therefore the repetitive block y0 repeated for n−m−1 times and a sequential block y1 that are remained in Y are retained to a new state machine Z according to a time sequence relationship.

After the splicing is completed, the new combined state machine Z is generated: The two instructions x0 and y0 are concurrently executed at a moment t, and are repeatedly executed for m clock cycles; the two instructions x1 and y0 are concurrently executed at the moment t+m; the instruction y0 is executed at a moment t+m+1, and is repeatedly executed for n−m−1 cycles; and the instruction y1 is executed at the moment t+n. It can be learned that, after the state machine splicing, instructions in multiple state machines can be concurrently executed, so that instruction level parallelism of an entire application program is improved. That is, the instruction level parallelism (ILP) is implemented, that is, multiple instructions are simultaneously executed at a same moment.

It can be learned from the foregoing example of the state machine splicing that, a process of the state machine splicing is: Program blocks that are executed earliest are successively taken out from two state machines in a time sequence, and a program block that is executed for a longer time is equivalently changed and converted into a target program block that has a similar structure as a program block that is executed for a shorter time (if the target program block is a sequential block, a same quantity of instructions are included; if the target program block is a repetitive block, quantities of repeated execution times are the same; if the target program block is a cyclical block, cycle conditions are the same); and then instructions in the two program blocks are combined, that is, the instructions in the two program blocks are simultaneously executed in a new state machine. The foregoing process is continuously repeatedly performed, until a state machine has no instruction that is not spliced.

The following further explains and describes the technical solution in the present invention by using a vector addition example. It is assumed that, two vectors whose lengths are 100 are loaded from a memory, an addition operation is performed, and finally an addition result is written back into the memory. It is further assumed that, in an accelerator, four cycles are required to complete a data load instruction, and two cycles are required to complete an addition instruction.

According to the technical solution in this embodiment of the present invention, three steps are required to generate a complete accelerator program description.

Figure 10:
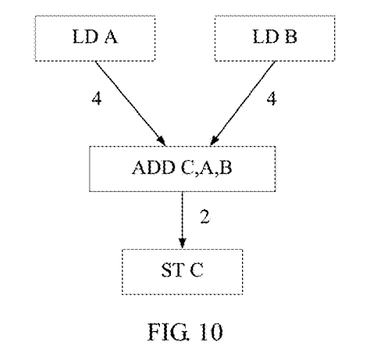
FIG. 10 is a DAG graph of a vector addition operation.

1. A data flow diagram is depicted by using a DAG. As shown in FIG. 10, data loading includes four cycles, and an addition operation includes two cycles.

As shown in FIG. 10, the DAG includes two data load unit nodes (which are represented as LD A and LD B), one adder node (which is represented as ADD C, A, B), and one storage unit node (which is represented as ST C). Data on sides of the DAG is respectively represented as: Two data load units (load unit) separately load data A/B from a memory; after four cycles, the loaded data A/B simultaneously takes effect, and an adder performs an operation of C=A+B (ADD C, A, B); and after two cycles, an operation result C of the adder takes effect, and a data storage unit writes back the operation result C into the memory.

Figure 11:
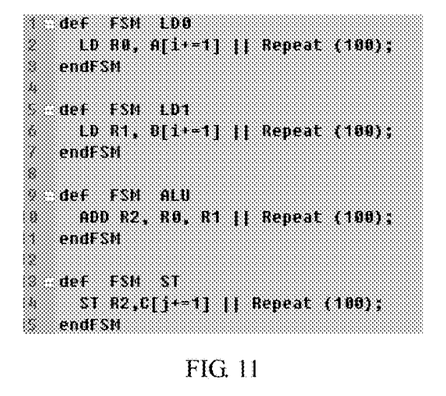
FIG. 11 is a description diagram of state machines of nodes in a DAG graph of a vector addition operation.

2. State machines of nodes are created. As shown in FIG. 11, each instruction in the state machines is repeatedly executed for 100 times.

As shown in FIG. 11, two data load unit state machines are separately defined as LD0 and LD1. Using the state machine LD0 as an example: "LD R0, A[i+=1]" indicates that required data is loaded from a memory address A[i] and saved in a register R0, and then the memory address is changed, that is, i=i+1; and "repeat(100)" indicates that a current instruction is repeatedly executed for 100 times (that is, 100 clock cycles). Similarly, an adder state machine is defined as ALU, a data storage unit state machine is defined as ST, and each "repeat(100)" in the state machines indicates that a corresponding instruction is repeatedly executed for 100 times.

Figure 12:
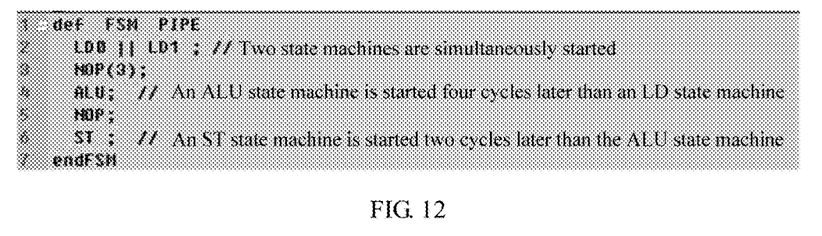
FIG. 12 is a schematic diagram of a program pipeline of a vector addition operation.

3. A program pipeline and an accelerator program description are formed according to sides of the DAG, as shown in FIG. 12. It can be learned according to the DAG that, the LD0 and LD1 state machines are simultaneously started; after three cycles, the ALU state machine is started; and after two more cycles, the ST state machine is started.

As shown in FIG. 12, functional units of nodes in the DAG are connected according to delays on the sides of the DAG, to form a pipeline corresponding to an accelerator application program. Specifically, a new state machine PIPE is defined. In the state machine, the state machines LD0 and LD1 are simultaneously started, the ALU state machine is started (three NOPs are inserted between the LD0/LD1 state machine and the ALU state machine, to indicate that the ALU state machine is started four clock cycles later than the LD0/LD1 state machine) after four clock cycles, and the ST state machine is started after two more clock cycles.

Figure 13:
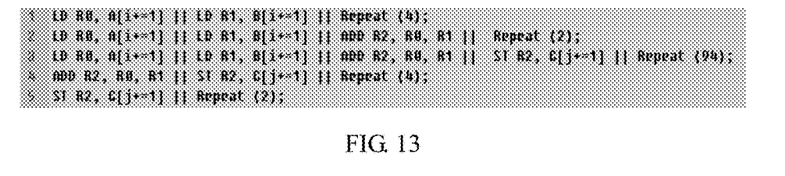
FIG. 13 is a description diagram of an accelerator program of a vector addition operation.

Finally, the accelerator compilation tool receives the program description as basic input, and after the three basic steps of intermediate expression generation, state machine splicing, and program correctness detection, an accelerator program that finally has high instruction level parallelism is generated, as shown in FIG. 13.

As shown in FIG. 13, the first line of instruction indicates that the instructions in the two state machines LD0 and LD1 are simultaneously executed and are repeatedly executed for four clock cycles. The second line of instruction indicates that the instructions in the three state machines LD0/LD1/ALU are simultaneously executed and are repeatedly executed for two clock cycles. The entire application program reaches maximum parallelism on the third line of instruction (that is, the seventh clock cycle), and instructions in the four state machines LD0/LD1/ALU/ST are simultaneously executed and are repeatedly executed for 94 clock cycles. Therefore, it can be learned that, after state machine splicing, instructions in multiple state machines can be concurrently executed, that is, an accelerator program that has high instruction level parallelism is generated during the state machine splicing.

It can be learned from the foregoing description that, this embodiment of the present invention provides the method for generating an accelerator program. In the technical solution, the accelerator program description that is based on a state machine is obtained, and the state machine splicing is performed on the state machines in the accelerator program description by using the compilation tool, to generate the accelerator program, so that instructions that can be concurrently transmitted (the transmission is an action of reading the instructions from an instruction memory into an operation unit for execution) are combined, pipeline cavitation can be eliminated, and instruction level parallelism of the application program and pipeline utilization are improved. In the technical solution, state machines of a same type are combined by means of the state machine splicing, to form a repetitive block, and an instruction is read once and used for multiple times, so that program storage space is reduced, and power consumption is reduced. In the technical solution, when a structure of the accelerator changes (for example, an instruction is delayed), only a pipeline description needs to be modified, so that flexibility and adaptability of the program are enhanced. In the technical solution, the pipeline is formed according to a DAG description state set, and processing of the state machine and the pipeline is implemented by the compilation tool, so that programming burden can be reduced.

In the technical solution in this embodiment of the present invention, the program data flow diagram is described by using the DAG, the accelerator program description that is based on a state machine is established, and the state machine splicing is performed on the state machines in the program description by using the accelerator compilation tool, to generate the accelerator program, so that instruction level parallelism can be implemented, and hardware performance utilization of an accelerator is improved. In the technical solution, the compilation tool focuses on general program structure analysis, and needs to compile only the program description, and the compilation tool does not need to perform mapping between an advanced language and the accelerator instruction set, so that relatively good performance is obtained when program development is performed on the accelerator. Compared with an accelerator program that is for a particular algorithm and that needs to be manually developed and optimized by an assembly programmer, in the technical solution, program development efficiency can be improved while ensuring pipeline utilization. Compared with program development performed by using a compilation technology, better program performance can be obtained in some field-dedicated accelerators by means of the technical solution.

Embodiment 2

To better implement the foregoing solution of the embodiments of the present invention, the following further provides a related apparatus configured to implement the foregoing solution.

Figure 14:
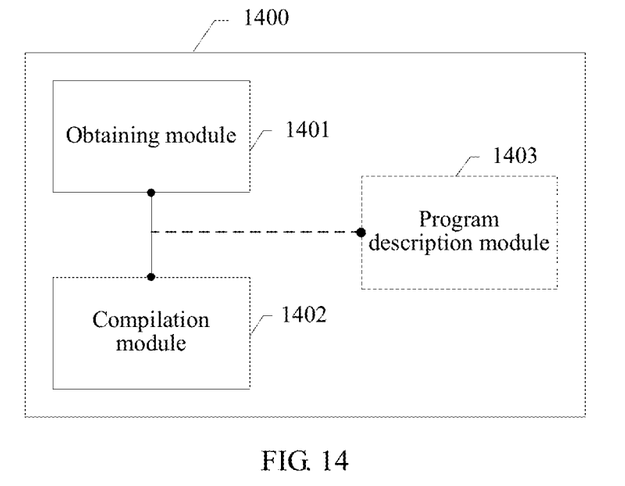
FIG. 14 is a schematic structural diagram of a system for generating an accelerator program according to an embodiment of the present invention.

Referring to FIG. 14, this embodiment of the present invention provides a system 1400 for generating an accelerator program. The system may include:

an obtaining module 1401, configured to obtain an accelerator program description that is based on a state machine, where the accelerator program description includes multiple state machines separately configured to implement an application program, and the multiple state machines form a pipeline according to a data dependency in a directed acyclic graph DAG corresponding to the application program; and a compilation module 1402, configured to perform state machine splicing on the state machines in the accelerator program description by using an accelerator compilation tool, to generate an accelerator program.

The compilation module 1402 is corresponding to the foregoing compilation tool.

In some embodiments of the present invention, the compilation module 1402 is specifically configured to: establish an intermediate expression of each state machine in the accelerator program description, and splice intermediate expressions that have a same structure and that are of different state machines, to generate a combined state machine and obtain the accelerator program.

In some embodiments of the present invention, the compilation module 1402 includes an expression generation unit, configured to: analyze a basic structure of each state machine in the accelerator program description by using the accelerator program description as basic input and based on an accelerator microarchitecture characteristic, and convert each state machine into the intermediate expression. The intermediate expression includes one or more of a sequential block, a cyclical block, or a repetitive block.

In some embodiments of the present invention, the compilation module 1402 further includes a state machine splicing unit, configured to splice sequential blocks in the different state machines, splice cyclical blocks in the different state machines, or splice repetitive blocks in the different state machines. The state machine splicing unit is configured to determine, according to a timing constraint relationship between the different state machines, to splice intermediate expressions that are of the different state machines and that have a same structure and can be concurrently executed, so as to concurrently execute instructions in the different state machines.

In some embodiments of the present invention, the compilation module 1402 is further configured to perform program correctness detection on the generated accelerator program.

In some embodiments of the present invention, the compilation module 1402 further includes a correctness detection unit, configured to perform correctness detection on the accelerator program by detecting whether the generated accelerator program satisfies a constraint of an accelerator instruction set.

In some embodiments of the present invention, the correctness detection unit is specifically configured to perform syntax structure detection, resource conflict detection, and data correlation detection on the generated accelerator program.

In some embodiments of the present invention, the system further includes: a program description module 1403, configured to: describe a program data flow diagram by using the directed acyclic graph DAG, separately create state machines of multiple nodes in the DAG by using the accelerator instruction set, and establish the pipeline between the state machines according to a time delay indicated by a side in the DAG, to obtain the accelerator program description.

It may be understood that, functions of functional modules of the system for generating an accelerator program in this embodiment of the present invention may be specifically implemented according to the method in the foregoing method embodiment. For a specific implementation process of the functions, refer to related descriptions in the foregoing method embodiment. Details are not described herein again.

It can be learned from the foregoing description that, in some feasible implementations of the present invention, the system for generating an accelerator program is provided. In the technical solution, the accelerator program description that is based on a state machine is obtained, and the state machine splicing is performed on the state machines in the accelerator program description by using the compilation tool, to generate the accelerator program, so that instruction level parallelism can be implemented, and hardware performance utilization of an accelerator is improved. In the technical solution, the compilation tool needs to compile only the program description, and the compilation tool does not need to perform mapping between an advanced language and an accelerator instruction set, so that relatively good performance is obtained when program development is performed on the accelerator. Compared with an accelerator program that is for a particular algorithm and that needs to be manually developed and optimized by an assembly programmer, in the technical solution, program development efficiency can be improved while ensuring pipeline utilization. Compared with program development performed by using a compilation technology, better program performance can be obtained in some field-dedicated accelerators by means of the technical solution.

Embodiment 3

This embodiment of the present invention further provides a computer storage medium. The computer storage medium may store one or more programs. When being executed, the one or more programs include some or all steps of the method for generating an accelerator program that is recorded in the foregoing method embodiment. Alternatively, when the one or more programs are run by a computer device that includes one or more accelerators and one or more processors, the computer device performs the method for generating an accelerator program that is recorded in the foregoing method embodiment.

Embodiment 4

Figure 15:
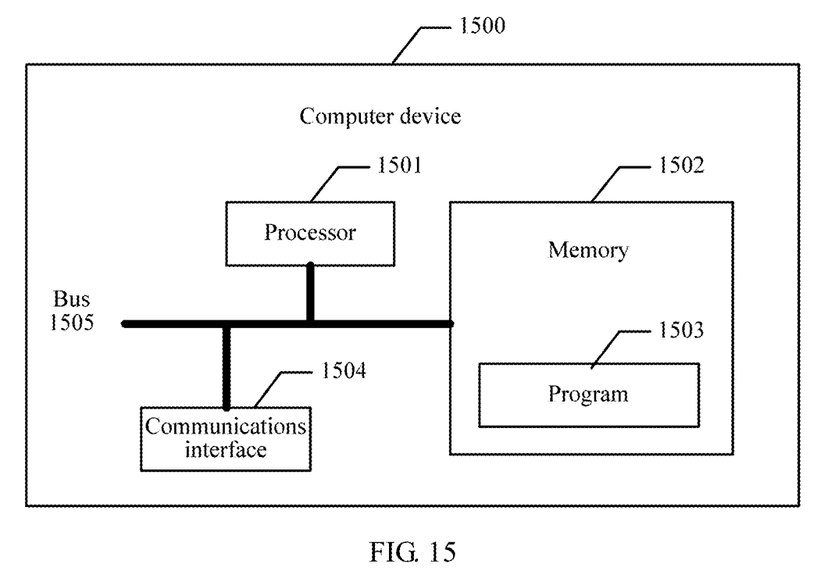
FIG. 15 is a schematic structural diagram of a computer device according to an embodiment of the present invention.

Referring to FIG. 15, this embodiment of the present invention further provides a computer device 1500. The computer device 1500 may include a processor 1501 and a memory 1502.

The memory 1502 is configured to store a program 1503. When the computer device 1500 is run, the processor 1501 executes the program stored in the memory 1502, so that the computer device 1500 performs the method for generating an accelerator program that is recorded in the foregoing method embodiment.

The computer device may further include a communications interface 1504 and a bus 1505. The processor 1501, the memory 1502, and the communications interface 1504 communicate with each other by using the bus 1505. The communications interface 1504 is configured to receive and send data.

It can be learned from the foregoing description that, in some feasible implementations of the present invention, the computer device is provided, and can perform the method for generating an accelerator program that is provided in the foregoing method embodiment, and achieve the technical effect of the method.

In the foregoing embodiments, the description of the embodiments has respective focuses. For a part that is not described in detail in an embodiment, refer to related descriptions in other embodiments.

In the specification, claims, and accompanying drawings of the present invention, terms "include" and "have" and any of their variations are intended to cover nonexclusive including. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be noted that, for ease of description, the foregoing method embodiments are described as a series of action combinations. However, a person skilled in the art should understand that the present invention is not limited to the described sequence of the actions, because some steps may be performed in another sequence or performed at the same time according to the present invention. In addition, a person skilled in the art should also appreciate that all the embodiments described in the specification are example embodiments, and the related actions and modules are not necessarily mandatory to the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The method and system for generating an accelerator program that are provided in the embodiments of the present invention are described in detail above. Principles and implementations of the present invention are described in this document by using specific examples. The description about the embodiments is merely used to help understand the method and core ideas of the present invention. In addition, a person of ordinary skill in the art may modify specific implementations and application scopes according to the ideas of the present invention. Therefore, content of the specification shall not be construed as a limit to the present invention.

What is claimed is:

1. A method for generating an accelerator program, comprising:
    obtaining, by a computer device, an accelerator program description, wherein the accelerator program description comprises multiple state machines configured to implement an application program, and the multiple state machines form a pipeline according to a data dependency in a directed acyclic graph (DAG) corresponding to the application program; and
    Performing state machine splicing on the multiple state machines in the accelerator program description by using an accelerator compilation tool of the computer device, to generate an accelerator program.

2. The method according to claim 1, wherein the performing state machine splicing on the state machines in the accelerator program description by using the accelerator compilation tool of the computer device, to generate the accelerator program comprises:
    establishing an intermediate expression of each state machine in the accelerator program description, and splicing intermediate expressions that have a same structure and that are of different state machines, to generate a combined state machine and obtain the accelerator program.

3. The method according to claim 2, wherein the establishing the intermediate expression of each state machine in the accelerator program description comprises:
    Analyzing a basic structure of each state machine in the accelerator program description by using the accelerator program description as basic input and based on an accelerator microarchitecture characteristic, and converting each state machine into the intermediate expression, wherein the intermediate expression comprises one or more of a sequential block, a cyclical block, or a repetitive block.

4. The method according to claim 3, wherein the splicing intermediate expressions that have the same structure and that are of different state machines comprises:
    Splicing sequential blocks in the different state machines, splicing cyclical blocks in the different state machines, or splicing repetitive blocks in the different state machines.

5. The method according to claim 3, wherein the splicing intermediate expressions that have the same structure and that are of different state machines comprises:
    determining, according to a timing constraint relationship between the different state machines, intermediate expressions that are of the different state machines and that have the same structure and that can be concurrently executed;
    splicing the intermediate expressions so as to concurrently execute instructions in the different state machines.

6. The method according to claim 1, further comprising:
    Performing program correctness detection on the generated accelerator program.

7. The method according to claim 6, wherein the performing program correctness detection on the generated accelerator program comprises:
    performing program correctness detection on the accelerator program by detecting whether the generated accelerator program satisfies a constraint of an accelerator instruction set.

8. The method according to claim 7, wherein the performing correctness detection on the accelerator program by detecting whether the generated accelerator program satisfies the constraint of the accelerator instruction set comprises:

performing syntax structure detection, resource conflict detection, and data correlation detection on the generated accelerator program.

9. The method according to claim 1, wherein the obtaining an accelerator program description comprises:
describing a data flow diagram of the application program by using the DAG, creating a state machine of each node in the DAG by using the accelerator instruction set, and establishing the pipeline between the state machines according to a time delay indicated by a side in the DAG, to obtain the accelerator program description.

10. The method according to claim 9, wherein each node in the DAG represents a functional component of a processor or an accelerator that executes the application program.

11. A system for generating an accelerator program, comprising:
at least one processor; and
a non-transitory computer-readable storage medium coupled to the at least one processor and storing programming instructions for execution by the at least one processor, wherein the programming instructions instruct the at least one processor to:
obtain an accelerator program description, wherein the accelerator program description comprises multiple state machines configured to implement an application program, and the multiple state machines form a pipeline according to a data dependency in a directed acyclic graph DAG corresponding to the application program; and
perform state machine splicing on the multiple state machines in the accelerator program description by using an accelerator compilation tool, to generate an accelerator program.

12. The system according to claim 11, wherein the programming instructions instruct the at least one processor to:
establish an intermediate expression of each state machine in the accelerator program description, and splice intermediate expressions that have a same structure and that are of different state machines, to generate a combined state machine and obtain the accelerator program.

13. The system according to claim 12, wherein the programming instructions instruct the at least one processor to:
analyze a basic structure of each state machine in the accelerator program description by using the accelerator program description as basic input and based on an accelerator microarchitecture characteristic, and convert each state machine into the intermediate expression, wherein the intermediate expression comprises one or more of a sequential block, a cyclical block, or a repetitive block.

14. The system according to claim 13, wherein the programming instructions instruct the at least one processor to:
splice sequential blocks in the different state machines, splice cyclical blocks in the different state machines, or splice repetitive blocks in the different state machines.

15. The system according to claim 14, wherein the programming instructions instruct the at least one processor to:
determine, according to a timing constraint relationship between the different state machines, intermediate expressions that are of the different state machines and that have the same structure and that can be concurrently executed;
splice, the intermediate expressions so as to concurrently execute instructions in the different state machines.

16. The system according to claim 11, wherein the programming instructions instruct the at least one processor to:
perform program correctness detection on the generated accelerator program.

17. The system according to claim 16, wherein the programming instructions instruct the at least one processor to:
perform correctness detection on the accelerator program by detecting whether the generated accelerator program satisfies a constraint of an accelerator instruction set.

18. The system according to claim 17, wherein the programming instructions instruct the at least one processor to:
perform syntax structure detection, resource conflict detection, and data correlation detection on the generated accelerator program.

19. The system according to claim 11, further comprising:
the programming instructions instruct the at least one processor to:
describe a data flow diagram of the application program by using the DAG, create a state machine of each node in the DAG by using the accelerator instruction set, and establish the pipeline between the state machines according to a time delay indicated by a side in the DAG, to obtain the accelerator program description.

20. The system according to claim 19, wherein each node in the DAG represents a functional component of a processor or an accelerator that executes the application program.

21. A computer device, wherein the computer device comprises a processor and a memory, wherein the memory is configured to store a program, and when the computer device runs, the processor executes the program stored in the memory, so that the computer device performs the method for generating an accelerator program according to claim 1.

* * * * *